US010466475B2

(12) United States Patent
Chen

(10) Patent No.: US 10,466,475 B2
(45) Date of Patent: Nov. 5, 2019

(54) HEAD MOUNTED VIRTUAL REALITY OBJECT SYNCHRONIZED PHYSICAL TRAINING SYSTEM

(71) Applicant: Bion Inc., New Taipei (TW)

(72) Inventor: Yi-Lun Chen, Taipei (TW)

(73) Assignee: BION INC., New Taipei (TW)

( * ) Notice: Subject to any disclaimer, the term of this patent is extended or adjusted under 35 U.S.C. 154(b) by 275 days.

(21) Appl. No.: 15/657,231

(22) Filed: Jul. 24, 2017

(65) Prior Publication Data

US 2018/0031832 A1 Feb. 1, 2018

(30) Foreign Application Priority Data

Jul. 26, 2016 (TW) .............................. 105123627 A

(51) Int. Cl.
*G02B 27/01* (2006.01)
*A63B 24/00* (2006.01)
*H04N 13/398* (2018.01)
*G06T 15/00* (2011.01)

(52) U.S. Cl.
CPC ............ *G02B 27/017* (2013.01); *A63B 24/00* (2013.01); *H04N 13/398* (2018.05); *G02B 2027/0138* (2013.01); *G06T 15/00* (2013.01)

(58) Field of Classification Search
CPC .......... G02B 27/017; A63B 24/00–2024/0096; H04N 13/398
USPC .......................................... 345/8; 482/51–78
See application file for complete search history.

(56) References Cited

U.S. PATENT DOCUMENTS

| 6,102,832 A * | 8/2000 | Tani ........................ G06F 3/011 482/4 |
| 7,224,326 B2 * | 5/2007 | Sefton ................. A63B 71/0622 345/8 |
| 7,780,573 B1 * | 8/2010 | Carmein ............ A63B 22/0242 482/4 |
| 9,119,987 B2 * | 9/2015 | Chen ........................ A61B 5/11 |
| 9,588,344 B2 * | 3/2017 | Chen .................. A63B 71/0669 |
| 2004/0063549 A1 * | 4/2004 | Kuo .................... A63B 22/0242 482/54 |
| 2005/0148432 A1 * | 7/2005 | Carmein ............ A63B 22/0235 482/8 |
| 2010/0035726 A1 * | 2/2010 | Fisher ................ A63B 24/0084 482/8 |

(Continued)

*Primary Examiner* — Michael Pervan
(74) *Attorney, Agent, or Firm* — Muncy, Geissler, Olds & Lowe, P.C.

(57) ABSTRACT

A head mounted virtual reality object synchronized physical training system includes a virtual reality device, a physical training equipment, and a physiological signal sensor. The virtual reality device includes a display operable to display a virtual reality object according to an operation of the user. The virtual reality device is detachably mounted to a head of the user and provides the user with a function of interaction. The physical training equipment includes an exercise data sensor operable to detect exercise data that the user operates the physical training equipment. The physiological signal sensor is operable to detect a human body physiological signal and a human body movement signal of the user. The physical training equipment and the physiological signal sensor have a function of synchronization with the virtual reality object displayed on the virtual reality device.

20 Claims, 12 Drawing Sheets

(56) References Cited

U.S. PATENT DOCUMENTS

| | | | | |
|---|---|---|---|---|
| 2011/0164044 A1* | 7/2011 | Huang | ............... | A63B 21/0004 |
| | | | | 345/473 |
| 2013/0237378 A1* | 9/2013 | Carrell | ................. | A63C 17/061 |
| | | | | 482/51 |
| 2014/0073481 A1* | 3/2014 | Aibara | ................. | G02B 27/017 |
| | | | | 482/1 |
| 2015/0182799 A1* | 7/2015 | Chen | ........................ | A61B 5/11 |
| | | | | 482/4 |
| 2015/0253571 A1* | 9/2015 | Chen | .................... | G02B 27/017 |
| | | | | 345/8 |
| 2016/0144916 A1* | 5/2016 | Chen | .......................... | B62J 6/00 |
| | | | | 482/8 |
| 2016/0300390 A1* | 10/2016 | Malafeew | .............. | A63F 13/245 |
| 2017/0080320 A1* | 3/2017 | Smith | ....................... | G10H 1/42 |
| 2017/0259155 A1* | 9/2017 | Park | ................... | A63B 71/0669 |

* cited by examiner

HEAD MOUNTED VIRTUAL REALITY OBJECT SYNCHRONIZED PHYSICAL TRAINING SYSTEM

BACKGROUND OF THE INVENTION

1. Field of the Invention

The present invention relates to a physical training system, and in particular to a physical training system in which data detected by a physical training equipment and a physiologic signal sensor and a virtual reality object displayed on a virtual reality device are made in synchronization with each other.

2. The Related Arts

The progress of science and technology make smart mobile phones, tablet devices, and computers electronic products that are indispensable to daily living of regular people. Application programs are involved these electronic products to provide different services to various users. In related technical solutions, some software suppliers have started developing multimedia video/audio devices that interact with physical training equipment. For example, a user may jog on a treadmill and a display is provided in front of the treadmill such that the display may show a virtual reality object, such as a mountain trail, and allow the maintain trail to change surrounding scene with the jogging activity of the user.

In known techniques, such as U.S. Pat. No. 9,119,987, when the trail or walkway shown on the display of the physical training equipment varies the slope thereof in an uphill or downhill path, only a resistive system makes responsive changes, and when the speed of the physical training system changes, only the speed of the image changes, and when a handlebar of the physical training equipment is rotated, only the direction of image is changed.

In another known technical solution, such as Taiwan Patent application No. 201019997, multiple sets of equipment, such as cameras, transportation devices, accelerometers, gyroscopes, global positioning systems (GPSs), wind gauges, and anemoscopes, are used to measure data and take real scene pictures. However, such a solution requires multiple times of picture taking, followed by post-production editing to make a perfect video. However, articles (such as virtual reality objects and characters) in the video are not made synchronous with the user. Further, such a solution only works for 2D or 3D image processing and is generally applicable to combination and synchronization of physical training facility and a user with the virtual reality objects shown in the video.

Those known solutions all suffer the following disadvantages. A virtual reality object in a virtual reality image of a physical training equipment is not interactive with a user in a bi-directional manner. The 2D or 3D image shown on the display of the physical training equipment only concern about 2D or 3D visual effect. Interaction between the virtual reality of the physical training equipment and a user can only be achieved through image processing based on installation of multiple cameras or externally arranged sensors, and is not a virtual reality object-synchronized interaction solution based on sensors built in the physical training equipment in combination with integration of dynamic states and physiological signals of the user. The image displayed on the display of the physical training equipment, the sensors, and the physiological signals of the user do not accord with each other in a synchronous interacting manner. The sound effect produced by the video of the physical training equipment is not made in synchronization with the sensors of the physical training equipment and the sounds generated by the user. The sensors of the physical training equipment, the resistive systems, and the likes are not synchronized with the virtual reality object shown in the interactive virtual reality and only provide video interaction of speed and resistance signals, not meeting the need for users of virtual reality. Thus, in view of the above, it is desired a novel solution that help a user to satisfactorily resolve the existing problems.

SUMMARY OF THE INVENTION

An objective of the present invention is to provide a head-wearing virtual reality object-synchronized physical training system that helps overcome the above-discussed problems.

Another objective of the present invention is to provide bi-directional synchronization physical training system, in which a virtual reality object displayed on a display of a virtual reality device is made in bi-directional synchronization with a physical training equipment and a physiological signal sensor.

An embodiment of the present invention provides a head-wearing virtual reality object-synchronized physical training system, which comprises a virtual reality device, a physical training equipment, and a physiological signal sensor. The virtual reality device comprises a display, and the display is operable to display a virtual reality object according to an operation of the user. The virtual reality device is detachably mounted to a head of the user and provides the user with a function of interaction. The physical training equipment comprises an exercise data sensor operable to detect exercise data that the user operates the physical training equipment. The physiological signal sensor is operable to detect a human body physiological signal and a human body movement signal of the user. The physical training equipment and the physiological signal sensor have a function of synchronization with the virtual reality object displayed on the virtual reality device.

The other embodiment of the present invention provides a head-wearing virtual reality object-synchronized physical training system with a synchronization signal transceiver. The virtual reality device transmits, through the synchronization signal transceiver, the virtual reality object to the physical training equipment and receives the exercise data from the physical training equipment, and receives the human body physiological signal from the human body physiological sensor, and then the virtual reality device make synchronization of the virtual reality object displayed on the display and the sound of the virtual reality device responsive to the received exercise data and the human body physiological signal through the synchronization signal transceiver.

In efficacy, the present invention combines a virtual reality device, a physical training equipment, and a physiological signal sensor. Bi-directional synchronization between a virtual reality object displayed on a display of the virtual reality device and the physical training equipment and the physiological signal sensor can be achieved.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
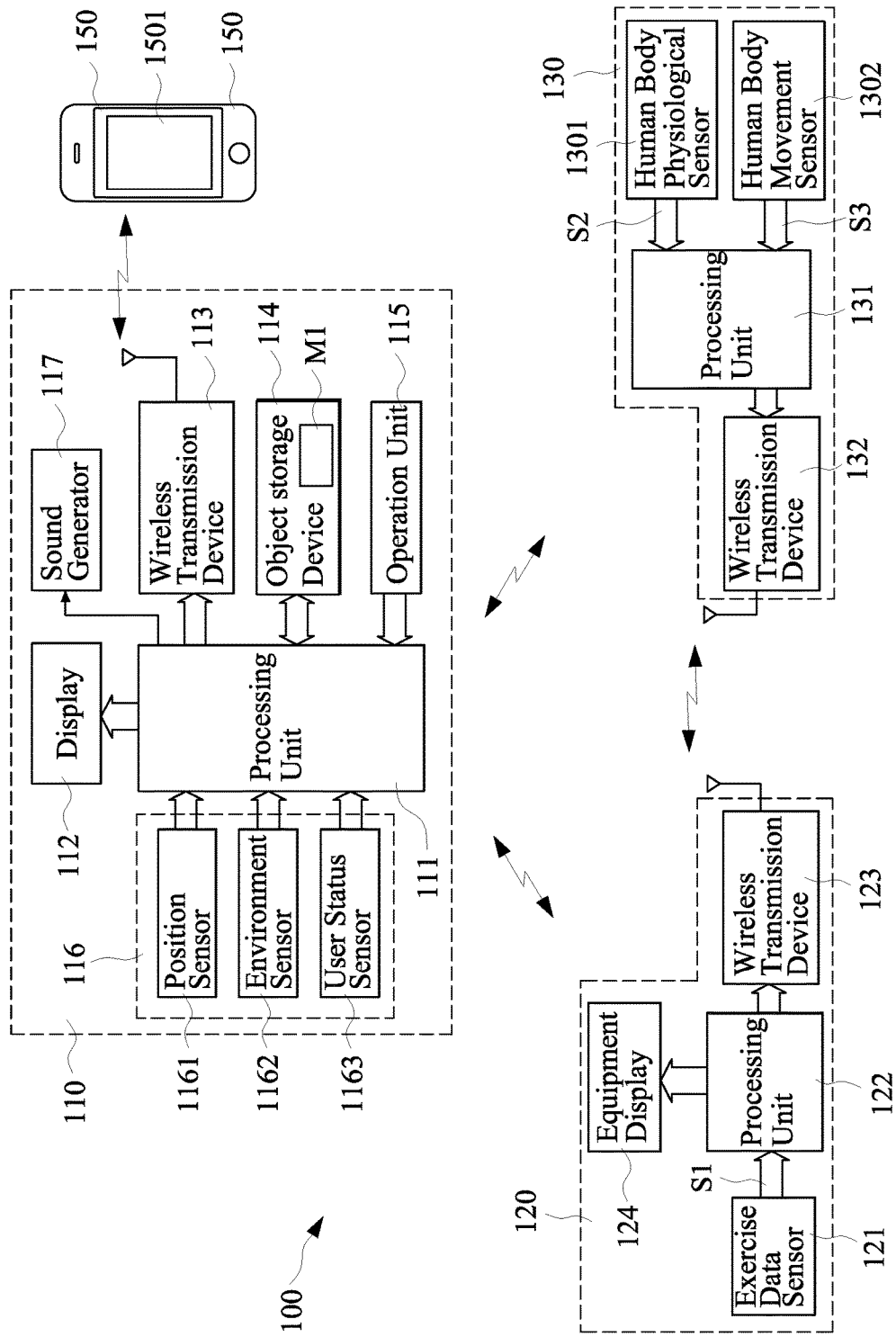
FIG. 1 is a block diagram showing a head-wearing virtual reality object-synchronized physical training system according to a first embodiment of the present invention.

Referring to FIG. 1, FIG. 1 is a block diagram of a head-wearing virtual reality object-synchronized physical training system according to a first embodiment of the present invention. As shown in FIG. 1, the head-wearing virtual reality object-synchronized physical training system 100 comprises a virtual reality device 110, a physical training equipment 120, and a physiological signal sensor 130, which are enabled, through wireless transmission devices built therein, to establish synchronous bi-directional connection.

Figure 2:
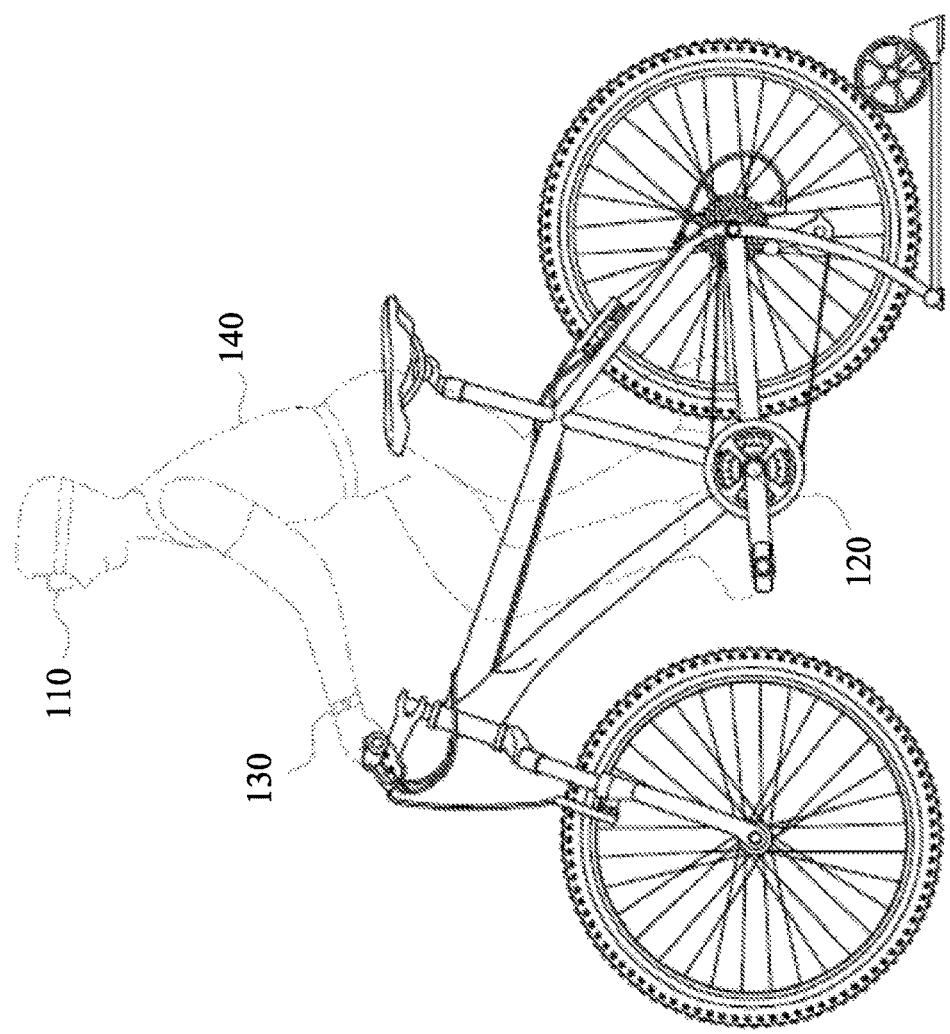
FIG. 2 is a schematic view illustrating a usage scenario of the head-wearing virtual reality object-synchronized physical training system according to the first embodiment of the present invention.

Also referring to FIG. 2, a schematic view is provided to illustrate a usage scenario of the head-wearing virtual reality object-synchronized physical training system according to the first embodiment of the present invention.

The virtual reality device 110 comprises a processing unit 111, a display 112, a wireless transmission device 113, an object storage device 114, an operation unit 115, at least one virtual reality sensor 116, and a sound generator 117. Among these devices/units, the processing unit 111 is built therein with a virtual reality program module for performing a virtual reality function. The wireless transmission device 113 is a bi-directional transceiver and can be a Bluetooth or wireless network.

The virtual reality sensor 116 may comprise various types of sensors/detectors required for realizing the virtual reality function, and may comprise for example a position sensor 1161, an environment sensor 1162, and a user status sensor 1163. The object storage device 114 stores therein at least one virtual reality object M1. The display 112 is operable to display the virtual reality object M1 in response to operation of the operation unit 115 by a user. The virtual reality device 110 is mounted, in a detachable manner, to a head of the user 140 to provide an interaction function to/with the user 140.

The physical training equipment 120 comprises at least one exercise data sensor 121, a processing unit 122, a wireless transmission device 123, and an equipment display 124. The exercise data sensor 121 is used to detect exercise data S1 of the user operating the physical training equipment 120.

The exercise data sensor 121 of the physical training equipment 120 may comprise for example a torque meter, which detects the level of torque, the trace of torque, direction, and variation of rotational speed that the user applies to operate the physical training equipment 120.

Figure 3A:
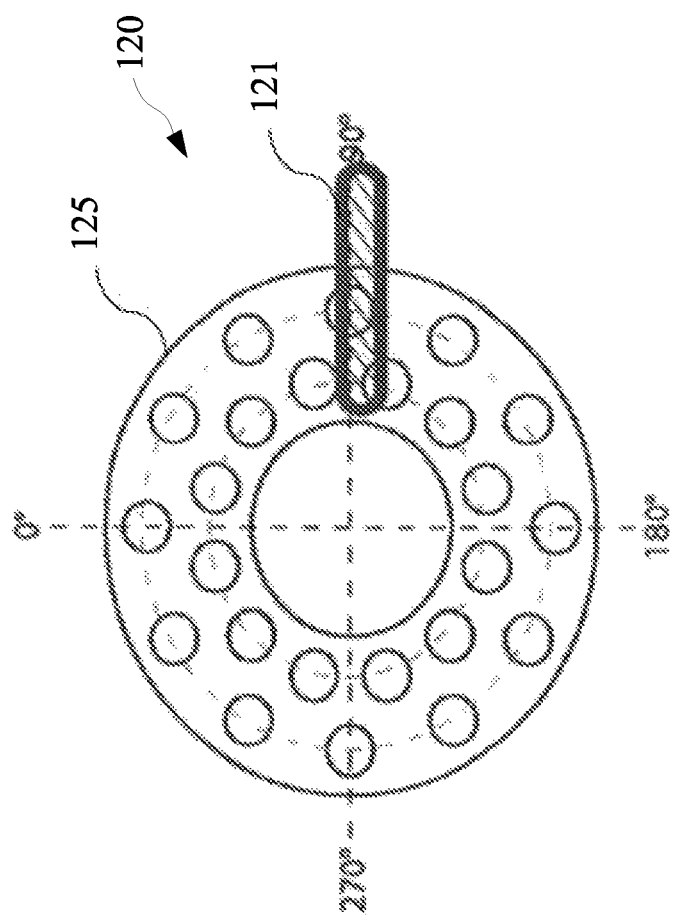
FIGS. 3a, 3b, 3c, 3d, and 3e are schematic views demonstrating different installation positions of sensors of a physical training equipment according to the first embodiment of the present invention.
Figure 3B:
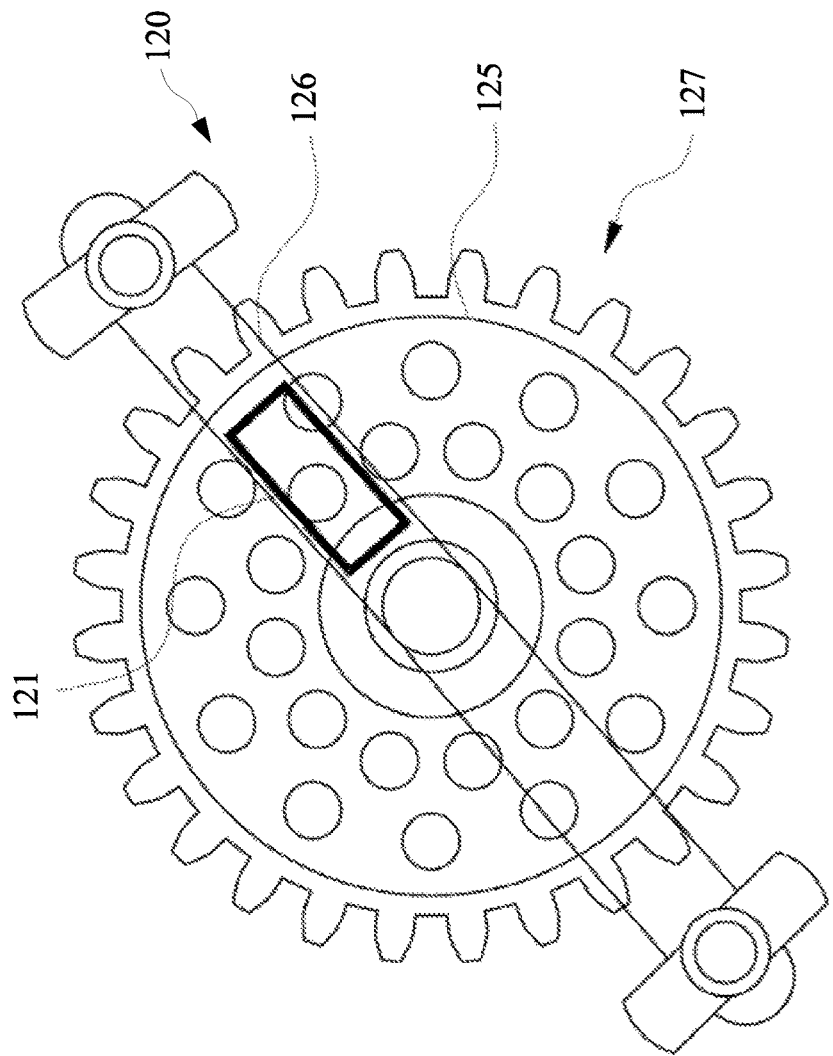

As shown in FIG. 3a, the exercise data sensor 121 of the physical training equipment 120 can be a concentric disc sensor and the exercise data sensor 121 is applied to detect rotation angle, movement trace, and direction of a flywheel 125 of the physical training equipment 120, in order to generate the exercise data S1. For example, the exercise data sensor 121 is mounted to an axle of the flywheel 125. Or alternatively, as shown in FIG. 3b, the exercise data sensor 121 is mounted to a pedal of a crank 126 on a stator side of a gear train 127 (for cadence).

Figure 3C:
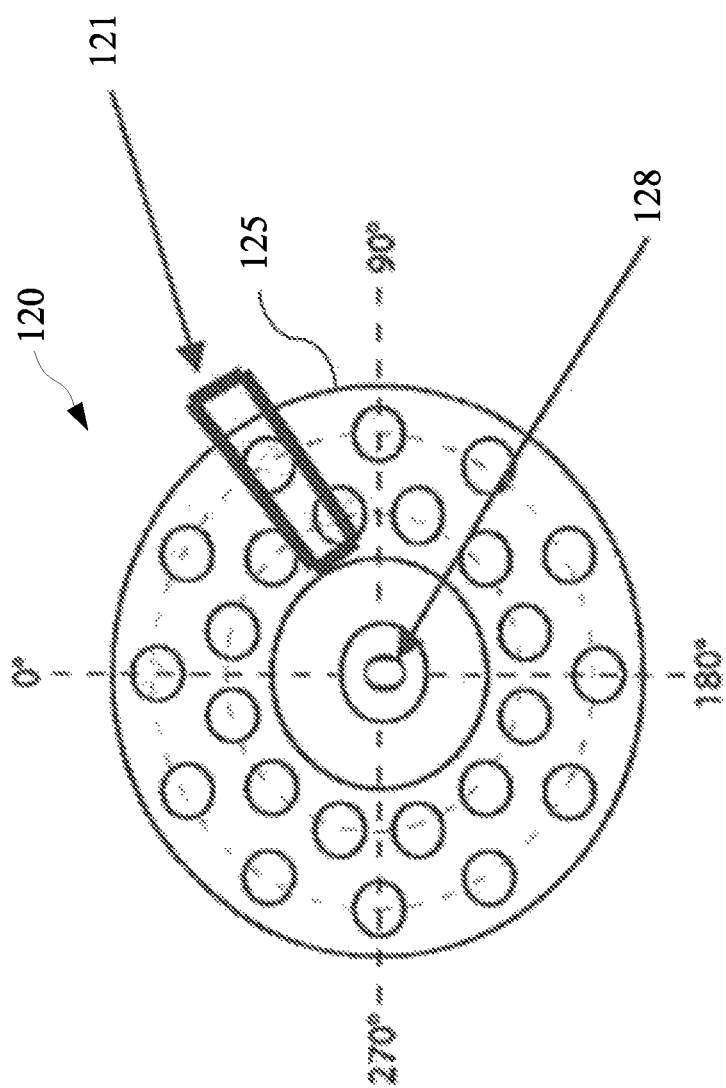
Figure 3D:
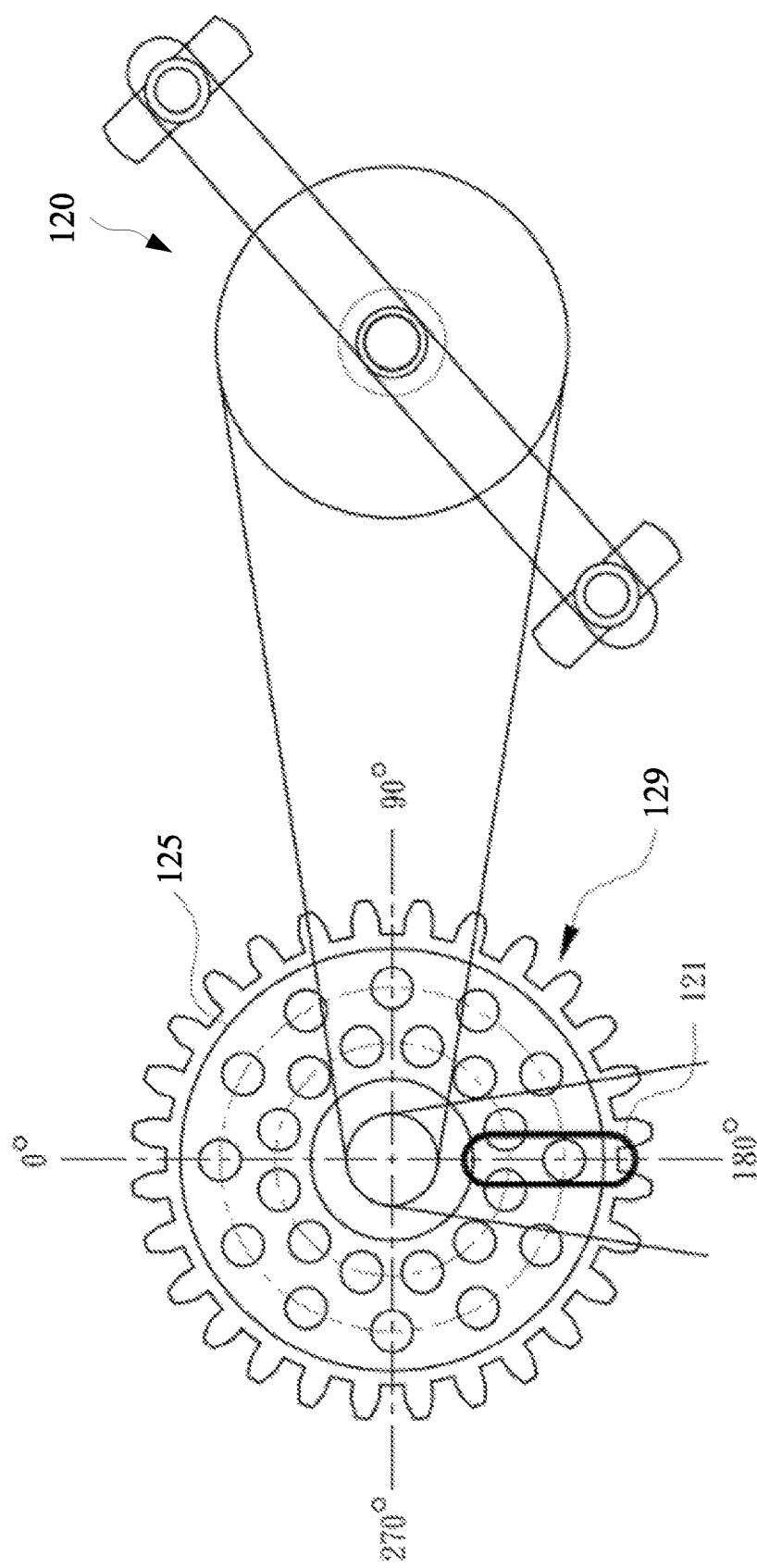
Figure 3E:
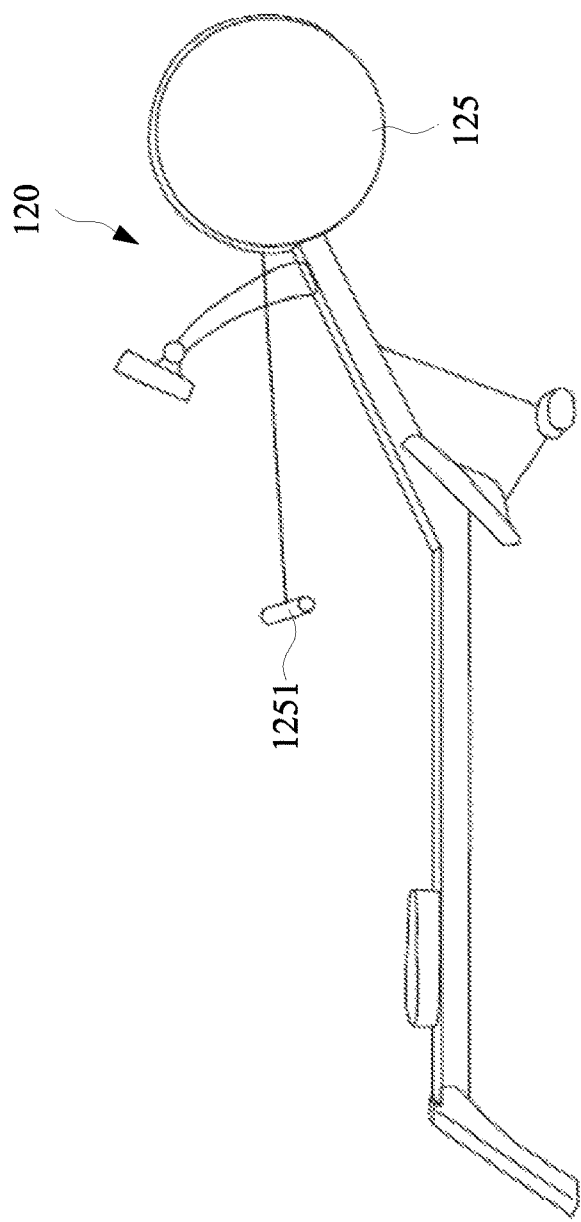

In another embodiment, as shown in FIG. 3c, the exercise data sensor 121 is a rotary sensor, which is mounted to the flywheel 125 and has a bearing 128 disposed at a center of the flywheel 125. In another embodiment, as shown in FIG. 3d, the exercise data sensor 121 is a flywheel sensor, which is mounted to a mounting seat 129 of a flywheel 125. As shown in FIG. 3e, the user 140 may hold a grip 1251 coupled to the flywheel 125 to make a sliding motion so as to cause the flywheel 125 to rotate and thus generate the exercise data S1.

In one embodiment, the exercise data sensor 121 of the physical training equipment 120 can be a magnet and a reed switch, a Hall transducer, a light-coupled switch and/or a motion sensor of two axes or more than two axes. For example, the motion sensor of two axes or more than two axes can be a gravity sensor (G sensor).

Figure 4:
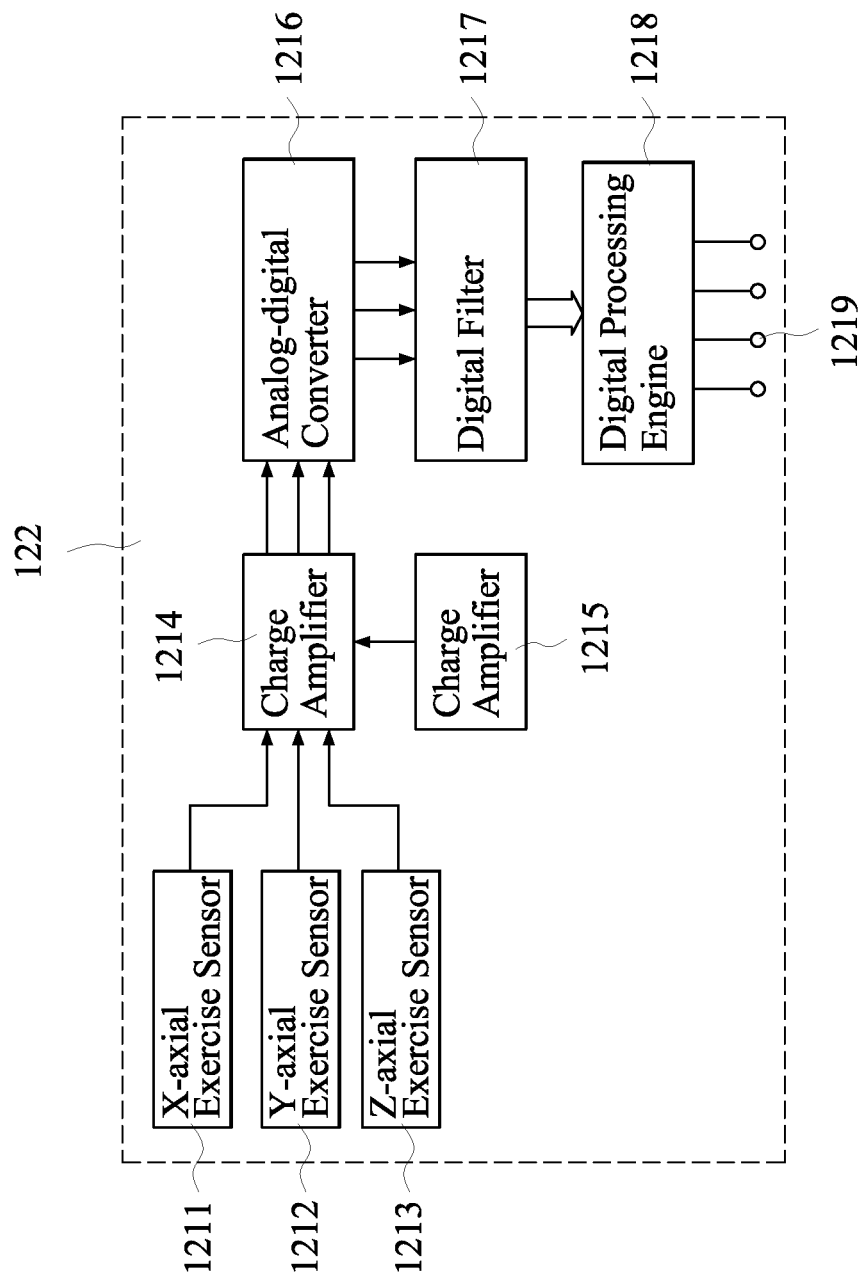
FIG. 4 is a circuit block diagram of a sensor of the physical training equipment according to the first embodiment of the present invention.

Referring to FIG. 4, which is a circuit block diagram of the exercise data sensor 121 of the physical training equipment 120 according to the first embodiment of the present invention, in this example, the exercise data sensor 121 is a gravity sensor. The exercise data sensor 121 comprises an X-axial exercise sensor 1211, a Y-axial exercise sensor 1212, a Z-axial exercise sensor 1213, a charge amplifier 1214, a temperature sensor 1215, an analog-digital converter 1216, a digital filter 1217, a digital processing engine 1218, and input/output terminals 1219. Among these components, the X-axial exercise sensor 1211, the Y-axial exercise sensor 1212, and the Z-axial exercise sensor 1213 are provided for detecting variations in X-axis, Y-axis, and Z-axis, respectively. The temperature sensor 1215 detects a variation of temperature. The charge amplifier 1214 is operable to convert mechanical readings acquired with the X-axial exercise data sensor 1211, the Y-axial exercise data sensor 1212, the Z-axial exercise data sensor 1213, and the temperature sensor 1215 into electrical charges in proportion thereto. The analog-digital converter 1216 is operable to convert a continuous signal in an analog form into a discrete signal in a digital form. The digital filter 1217 may subject a digital signal to wave filtration in order to acquire a discrete time system having desired response. Practically, the digital filter 1217 may comprise basic digital circuits, such as a register, a retarder, an adder, and a multiplier. The digital processing engine 1218 may be a known $I^2C$ digital engine capable of processing digital signals to obtain the exercise data S1, such as angular velocity, rotational speed, or position. The input/output terminals 1219 are provided for input and/or output of the exercise data S1.

Referring back to FIG. 1, the physiological signal sensor 130 comprises a human body physiological sensor 1301, a human body movement sensor 1302, a processing unit 131, and a wireless transmission device 132. The human body physiological sensor 1301 generates a human body physiological signal S2, and the human body movement sensor 1302 generates a human body movement signal S3. For example, the human body physiological sensor 1301 may comprise a heartbeat sensor, a blood pressure sensor, a temperature sensor, or a blood glucose sensor, which is mounted, in a detachable manner, to the chest, wrists, or other suitable portions of the human body of the user. The human body movement sensor 1302 may comprise for example a motion sensor of three or more axes, which is mounted, in a detachable manner, to a finger, a wriest, an arm, a foot, a shoe, or other suitable location of the user in order to measure the moving speed, acceleration, and direction of the user.

The physical training equipment 120 and the physiological signal sensor 130 may achieve, by means of connection through wireless communication, a function of bi-directional synchronization with the virtual reality object M1 shown on the display 112 of the virtual reality device 110. For example, the virtual reality device 110 transmits the virtual reality object M1 to the physical training equipment 120 and receives the exercise data S1 from the physical training equipment 120 and receive the human body physiological signal S2 and the human body movement signal S3 from the physiological signal sensor 130, and, in response to the exercise data S1, the human body physiological signal S2, and the human body movement signal S3, changes the virtual reality object M1 shown on the display 112 and sound of sound generator 117.

In one embodiment, the virtual reality device 110 is in communication with a smart mobile phone 150. For example, the smart mobile phone 150 may serve as an operation device (or a controller) of the virtual reality device 110 and the user 140 may operate the smart mobile phone 150 to select an operational mode of the virtual reality device 110. For example, the user may operate the smart mobile phone 150 to select a mountain hiking trail so that the virtual reality device 110 displays a virtual reality object corresponding to the maintain hiking trail, such as a slope path and surrounding scene. Or, for example, the user operates the smart mobile phone 150 to select a road-running activity so that the virtual reality device 110 displays a virtual reality object corresponding to the road-running activity, such as route and participators of the road-running activity. As such, the user may have the experience of seemingly personally attending the activity and runs with the virtual reality object. The smart mobile phone 150 may communicate with the virtual reality device 110 by means of near field communication (NFC), Bluetooth and/or wireless network.

In one embodiment, the smart mobile phone 150 may be designed to communicate with the physical training equipment 120, the physiological signal sensor 130 to replace with the virtual reality device 110. In this embodiment, the smart mobile phone 150 is provided with a phone screen 1501. A lens set 1502 may be externally attached onto the phone screen 1501 (such as Samsung Gear and Google carboard) of the smart mobile phone 150 to form the virtual reality device 110 to simulate a 3D image on the phone screen 1501 of the smart mobile phone 150.

In this embodiment, the phone screen includes two display screens to combine and form the 3D image on the phone screen of the smart mobile phone 150, by means of 3D image processing technic.

Figure 5:
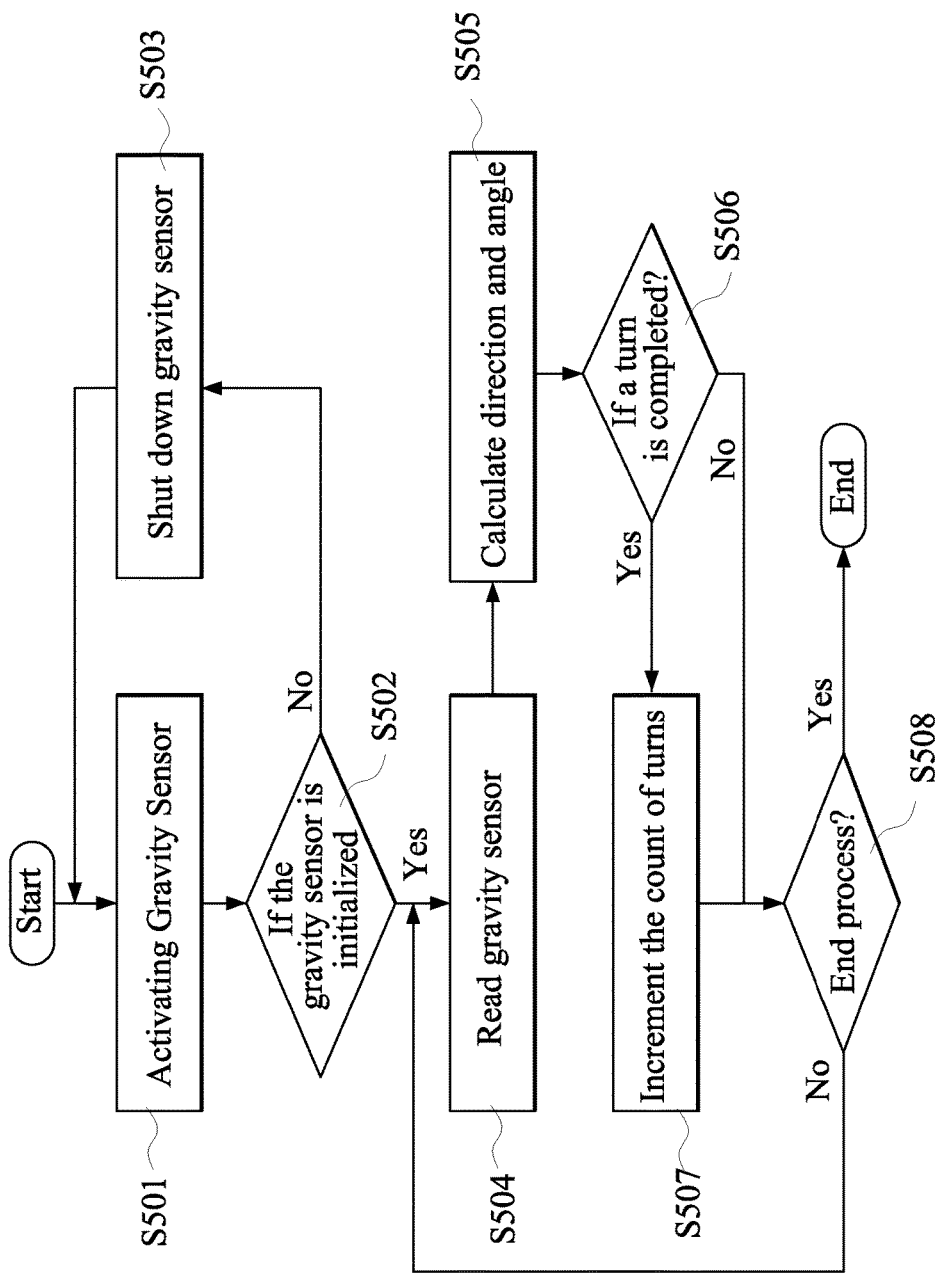
FIG. 5 is a flow chart demonstrating exercise data computation of the sensor of the physical training equipment according to the first embodiment of the present invention.

Referring to FIG. 5, it is a flow chart demonstrating exercise data computation of the sensor of the physical training equipment according to the first embodiment of the present invention. In Step S501, the gravity sensor is activated. In Step S502, a decision is made concerning if the gravity sensor is initialized, and if positive, then the process goes onto Step S504, and if negative, then the process goes to Step S503. In Step Sed503, the gravity sensor is shut down. In Step S504, the gravity sensor is read for computation of energy of the three axes of X, Y, and Z.

In Step S505, data acquired with the three axes of X, Y, and Z are used to calculate direction and angle. In Step S506, a decision is made concerning if a turn is completed (such as the flywheel of the physical training equipment having rotated for a full turn), and if positive, the process goes onto Step S507, the count of turns is incremented by one and then the process goes to Step S508, otherwise, the process goes to Step S508 directly. In Step S508, a decision is made concerning if to end the process, in other words to decide if the user stops operating the physical training equipment, and if positive, then the process ends, otherwise the process returns to Step S504.

Figure 6:
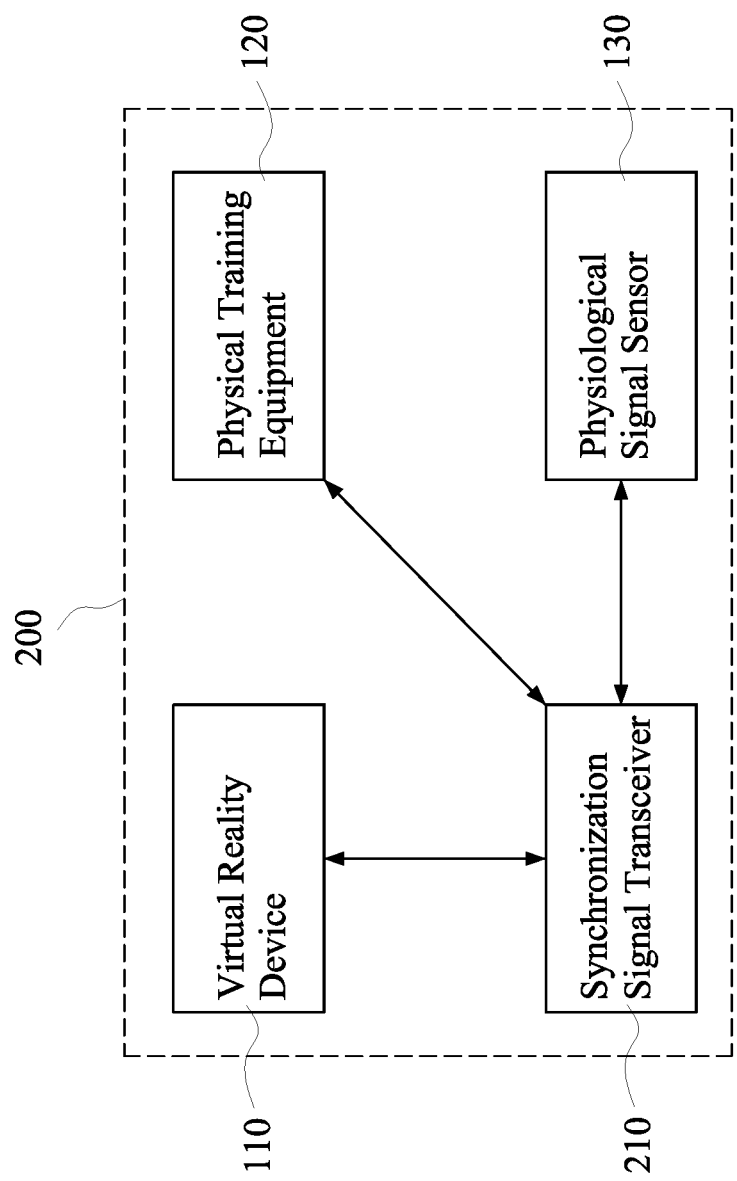
FIG. 6 is a block diagram showing a head-wearing virtual reality object-synchronized physical training system according to a second embodiment of the present invention.

FIG. 6 is a block diagram showing a head-wearing virtual reality object-synchronized physical training system according to a second embodiment of the present invention. The components of the instant embodiment are identical to those of the first embodiment and identical components are designated with the same reference numerals for consistency. As shown in FIG. 6, the head-wearing virtual reality object-synchronized physical training system 200 of the instant embodiment comprises a virtual reality device 110, a physical training equipment 120, a physiological signal sensor 130, and a synchronization signal transceiver 210. The virtual reality device 110, the physical training equipment 120, the physiological signal sensor 130, and the synchronization signal transceiver 210 establish connection with each other through Bluetooth or wireless network.

In the instant embodiment, the synchronization signal transceiver 210 may transmit a signal to and receive a signal from the physical training equipment 120 and the physiological signal sensor 130, and receives the exercise data from the physical training equipment 120 and the human body physiological signal and the human body movement signal from the physiological signal sensor 130, and transmits the exercise data, the human body physiological signal, and the human body movement signal received thereby to the virtual reality device 110. The virtual reality device 110 make synchronization of the virtual reality object shown on the display based on the exercise data and the physiological signal, and transmits a signal, through the synchronization signal transceiver 210, to the physical training equipment 120 and the physiological signal sensor 130 for bi-directional communication.

Figure 7A:
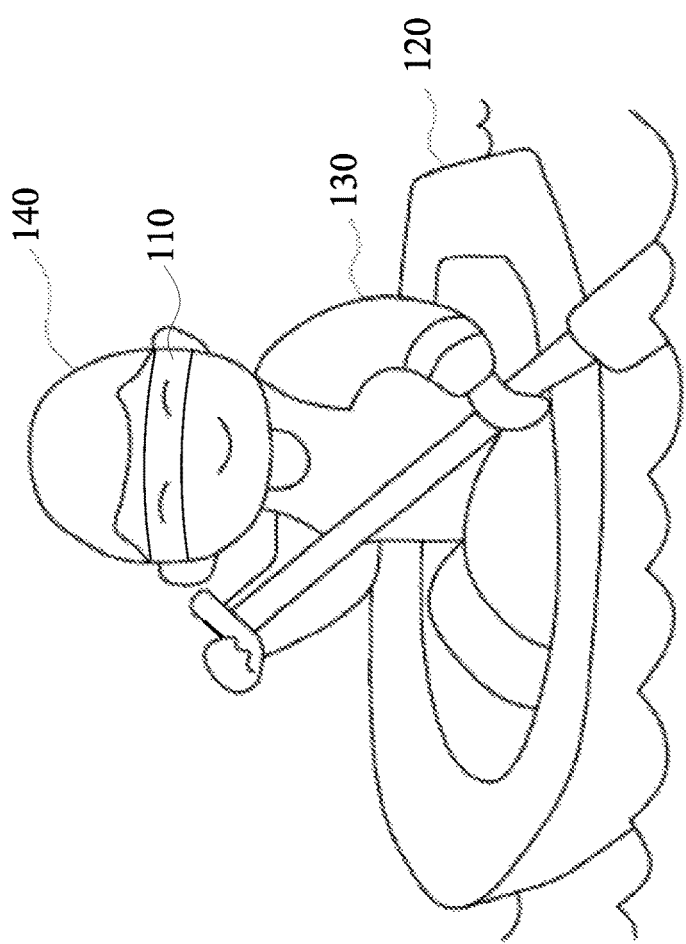
FIGS. 7a and 7b are schematic views illustrating usage scenarios of the head-wearing virtual reality object-synchronized physical training system according to an embodiment of the present invention.
Figure 7B:
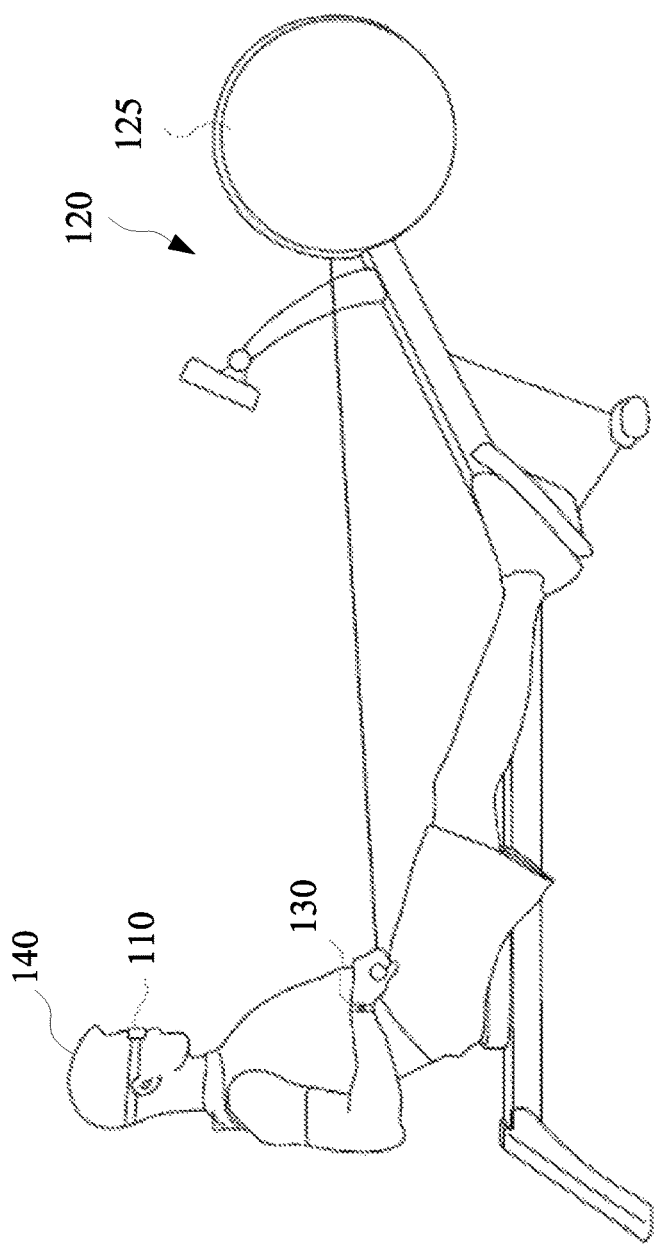

FIGS. 7a and 7b are schematic views illustrating usage scenarios of the head-wearing virtual reality object-synchronized physical training system 200 according to the second embodiment of the present invention. In the instant embodiment, FIG. 7a shows that a user rows a boat as the physical training equipment 120, while FIG. 7b shows that the physical training equipment 120 is a boat-rowing physical training machine. The physical training equipment 120 and the physiological signal sensor 130 are provided with a function of bi-directional synchronization with the virtual reality object display on the virtual reality device 110. For example, the virtual reality device 110 may have a bi-directional transmission function, which transmits a signal to the physical training equipment 120, receives the exercise data from the physical training equipment 120, receives the human body physiological signal and the human body movement signal from the physiological signal sensor 130, and, in response to the exercise data, the human body physiological signal, and the human body movement signal, change the motion and sound of the virtual reality object shown on the display of the virtual reality device 110. For those parts of the instant embodiment that are similar to those of the previous embodiment, repeated description will be omitted herein.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A head mounted virtual reality object synchronized physical training system, comprising:
   a virtual reality device detachably mounted to a head of a user, which includes a display for displaying at least one selected virtual reality object and a sound generator for generating at least one selected sound according to an operation of the user;
   a physical training equipment, which comprises at least one exercise data sensor operable to detect exercise data that the user operates the physical training equipment; and
   a physiological signal sensor including at least one human body physiological sensor for detecting at least one human body physiological signal of the user and at least one human body movement sensor for detecting at least one human body movement signal of the user;
   wherein the virtual reality device transmits the virtual reality object to the physical training equipment and receives the exercise data from the physical training equipment, and receives the human body physiological signal from the human body physiological sensor and the human body movement signal from the human body movement sensor, and then the virtual reality device changes the virtual reality object displayed on the display and the sound of the virtual reality device responsive to the received exercise data, the human body physiological signal, and the human body movement signal.

2. The system as claimed in claim 1, wherein the virtual reality device comprises a bi-directional transmission device for transmitting the virtual reality object to the physical training equipment and receiving the exercise data from the physical training equipment, and receiving the human body physiological signal from the human body physiological sensor and the human body movement signal from the human body movement sensor, so that the virtual reality device correspondingly changes the virtual reality object displayed on the display and the sound of the virtual reality device responsive to the received exercise data, the human body physiological signal, and the human body movement signal.

3. The system as claimed in claim 1, wherein the display of the virtual reality device comprises two display screens to form a 3D image to the user.

4. The system as claimed in claim 1, wherein the virtual reality device is in communication with a mobile phone serving as an operation device of the virtual reality device, the mobile phone being provided with a phone screen and a lens set externally attached onto the phone screen.

5. The system as claimed in claim 1, wherein the exercise data sensor of the physical training equipment comprises one of a concentric disc sensor, a rotary sensor and a flywheel sensor, and the exercise data sensor is operable to detect a rotation angle, a movement trace, and a direction of a flywheel of the physical training equipment to generate the exercise data.

6. The system as claimed in claim 1, wherein the exercise data sensor of the physical training equipment comprises one of a magnet and a reed switch, a Hall transducer, a light-coupled switch and a motion sensor of two axes or more than two axes.

7. The system as claimed in claim 1, wherein the exercise data sensor of the physical training equipment comprises a non-concentric disc sensor directly mounted to a pedal crank or on a pedal of the physical training equipment.

8. The system as claimed in claim 1, wherein the exercise data sensor of the physical training equipment comprises a torque meter to detect a torque level, a torque trace, a direction, and a rotational speed that the user operates the physical training equipment.

9. The system as claimed in claim 1, wherein the human body physiological sensor comprises one of a heartbeat sensor, a blood pressure sensor, a temperature sensor, and a blood glucose sensor, which is mounted, in a detachable manner, to one of a chest, a wrists, and a selected portion of the user.

10. The system as claimed in claim 1, wherein the human body movement sensor comprises a motion sensor of three or more axes, which is mounted, in a detachable manner, to one of a finger, a wriest, an arm, a foot, a shoe, and selected location of the user in order to measure one of a moving speed, an acceleration, and a direction of the user.

11. A head mounted virtual reality object synchronized physical training system, comprising:
    a virtual reality device detachably mounted to a head of a user, which includes a display for displaying at least one selected virtual reality object and a sound generator for generating at least one selected sound according to an operation of the user;
    a physical training equipment, which comprises at least one exercise data sensor operable to detect exercise data that the user operates the physical training equipment; and
    a physiological signal sensor including at least one human body physiological sensor for detecting at least one human body physiological signal of the user;
    a synchronization signal transceiver communicated with the physical training equipment, the physiological signal sensor and the virtual reality device; and
    wherein the virtual reality device transmits, through the synchronization signal transceiver, the virtual reality object to the physical training equipment and receives the exercise data from the physical training equipment, and receives the human body physiological signal from the human body physiological sensor, and then the virtual reality device make synchronization of the virtual reality object displayed on the display and the sound of the virtual reality device responsive to the received exercise data and the human body physiological signal through the synchronization signal transceiver.

12. The system as claimed in claim 11, wherein the virtual reality device comprises a bi-directional transmission device for transmitting the virtual reality object to the physical training equipment and receiving the exercise data from the physical training equipment, and receiving the human body physiological signal from the human body physiological sensor, so that the virtual reality device correspondingly changes the virtual reality object displayed on the display and the sound of the virtual reality device responsive to the received exercise data and the human body physiological signal.

13. The system as claimed in claim 11, wherein the display of the virtual reality device comprises two display screens to form a 3D image to the user.

14. The system as claimed in claim 11, wherein the virtual reality device is in communication with a mobile phone serving as an operation device of the virtual reality device, the mobile phone being provided with a phone screen and a lens set externally attached onto the phone screen.

15. The system as claimed in claim 11, wherein the exercise data sensor of the physical training equipment comprises one of a concentric disc sensor, a rotary sensor and a flywheel sensor, and the exercise data sensor is operable to detect a rotation angle, a movement trace, and a direction of a flywheel of the physical training equipment to generate the exercise data.

16. The system as claimed in claim 11, wherein the exercise data sensor of the physical training equipment comprises one of a magnet and a reed switch, a Hall transducer, a light-coupled switch and a motion sensor of two axes or more than two axes.

17. The system as claimed in claim 11, wherein the exercise data sensor of the physical training equipment comprises a non-concentric disc sensor directly mounted to a pedal crank or on a pedal of the physical training equipment.

18. The system as claimed in claim 11, wherein the exercise data sensor of the physical training equipment comprises a torque meter to detect a torque level, a torque trace, a direction, and a rotational speed that the user operates the physical training equipment.

19. The system as claimed in claim 11, wherein the human body physiological sensor comprises one of a heartbeat sensor, a blood pressure sensor, a temperature sensor, and a blood glucose sensor, which is mounted, in a detachable manner, to one of a chest, a wrists, and a selected portion of the user.

20. The system as claimed in claim 11, wherein the human body movement sensor comprises a motion sensor of three or more axes, which is mounted, in a detachable manner, to one of a finger, a wriest, an arm, a foot, a shoe, and selected location of the user in order to measure one of a moving speed, an acceleration, and a direction of the user.

\* \* \* \* \*